June 3, 1930.  R. W. ANDREWS  1,761,168
FLUID SEPARATOR
Filed April 19, 1926

INVENTOR
Roger W. Andrews
By E. J. Andrews
ATTORNEY.

Patented June 3, 1930

1,761,168

UNITED STATES PATENT OFFICE

ROGER W. ANDREWS, OF PITTSBURGH, PENNSYLVANIA, ASSIGNOR, BY MESNE ASSIGNMENTS, TO BLAW-KNOX COMPANY, OF BLAWNOX, PENNSYLVANIA, A CORPORATION OF NEW JERSEY

FLUID SEPARATOR

Application filed April 19, 1926. Serial No. 102,886.

Figure 1:
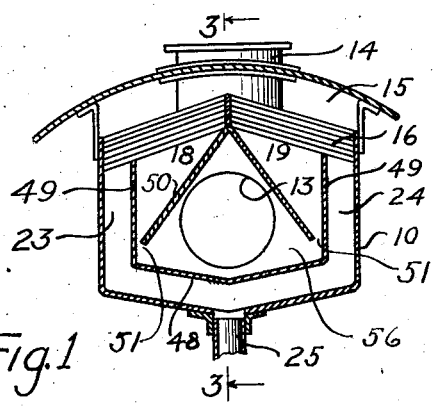
Figure 2:
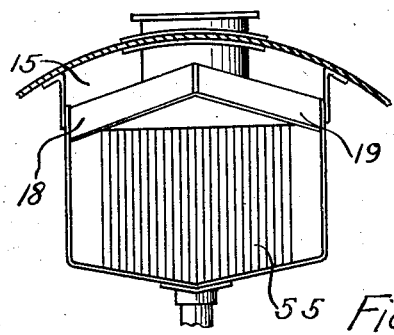
Figure 3:
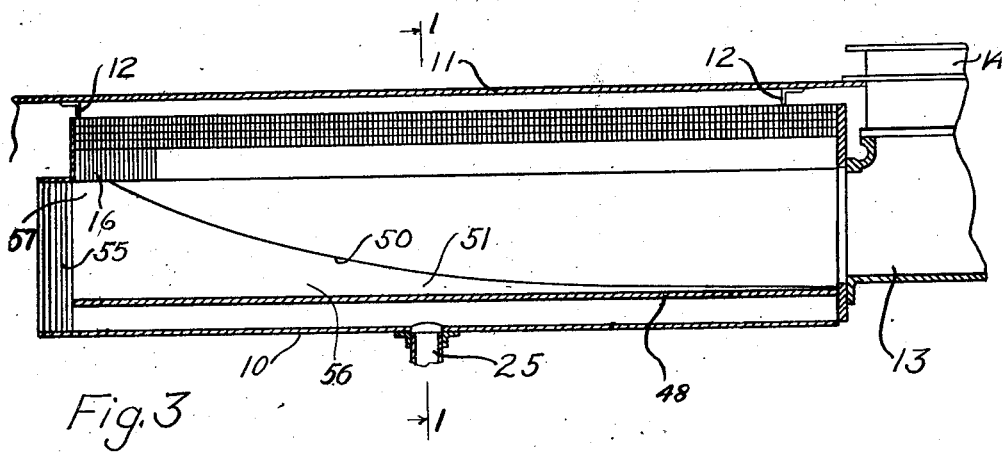
Figure 4:
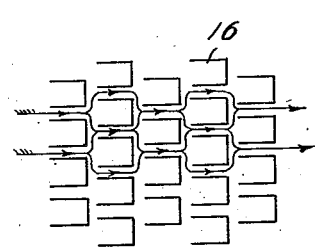
Figure 5:
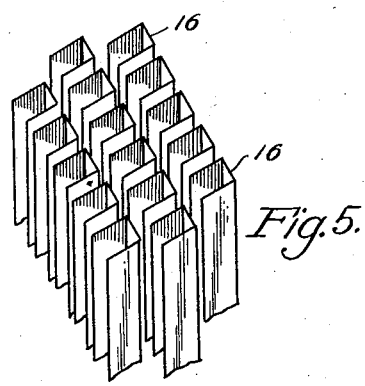

This invention relates to fluid separators or purifiers for separating liquids or other impurities from gases. The particular application of the separator which is illustrated and described in this specification is to steam boilers for drying and purifying the steam as it passes from the boiler to the steam main; but it is to be understood that the invention applies to various other uses. One of the objects of the invention is to provide a separator, the gas inlets of which are located on the upper side of the separator so that the gas, and particularly the steam in case of steam boilers, enters at the upper side, and is thus ordinarily drier than steam which enters the separator on the side of the apparatus. Another object is to provide for uniform flow of the steam through all portions of the purifying baffles of the separator. Other objects of the invention will be apparent from a consideration of the accompanying drawings and the following description thereof:

Of the drawings Fig. 1 is a transverse sectional view of a separator along the line 1—1 of Fig. 3; Fig. 2 is an end view of the separator; Fig. 3 is a longitudinal sectional view along the line 3—3 of Fig. 1; Fig 4 is an enlarged fractional end view of one of the banks of baffles of the separator; and Fig. 5 is a perspective view of the same.

The separator which I prefer comprises a casing 10 which is mounted in any suitable manner in a steam boiler 11. In this instance the separator is supported by hangers 12 in the upper steam space of the boiler. The separator has a steam outlet 13 communicating with the steam main 14 of the boiler system. It has steam inlets 15 in which are mounted steam purifying mechanism such as the baffles 16. These baffles may be of any suitable form. I prefer for the purpose in this instance the trough-shaped staggered baffles 16. These baffles are grouped into banks or cartons 18 and 19 with the troughs inclined, as indicated, so that, as the steam passes through the baffles, the moisture and other impurities, in a well known manner, will be separated from the steam and will flow downwardly towards the lower ends of the baffles.

Within the outer casing 10 is a middle casing formed by plates 48 and 49. Within this middle casing is an inner casing formed by the plates 50. One end of this inner casing communicates with the outlet 13 and the other end is closed by the bank of baffles 55. These casings are arranged to receive the steam as it passes from the baffles and to convey it to the outlet 13. The steam, after passing through the baffles, passes into the middle casing and from that through the inlets 51 formed by the lower edges of the walls of the inner casing 50 and the plates 48 and 49, and out through the outlet 13 to the steam main. At the same time the moisture separated from the steam flows down to the ends of the baffles 16 and overflows into the passageways 23 and 24 and thence into the liquid outlet 25, where the liquid passes to wherever it may be desired.

It will thus be seen that the steam which is received into the separator through the baffles 16 comes from the upper portion of the steam space, and thus this steam entering the separator carries with it a much less amount of moisture than would be the case if the steam entered on the sides of the separators. At the same time the moisture and the steam, after passing through the baffles, are completely separated by the plates 48 and 49 so that there is no opportunity for the steam to take up moisture in its passage through the separator and out to the steam mains. While one separator section only is shown it is understood that a plurality of sections may be used, being suitably connected end to end or otherwise.

I have set forth in my Patent No. 1,570,985, dated January 26, 1926, that it is desirable to have the steam flow at a substantially uniform rate throughout all portions of the baffles. If the speed of the steam is too great the drying thereof and purifying will be more or less imperfect, and if the speed is too slow the capacity of the separator will be diminished. It is, therefore, desirable, in order to maintain the speed substantially uniform at all points through the baffles, to maintain the pressure drop substantially uniform through all portions of the baffles. To assist in this I insert the casing 50 and locate the slots 51 along the lower central portion of the separator, and thus provide more uniform flow of the steam through the baffles. It is to be understood, however, that the slots 51 may be placed elsewhere if desired.

As the steam passes out of the separator at one end, the speed of the steam through the baffles adjacent that end ordinarily will be higher than towards the other end of the separator, because the drop in pressure is greater at the outlet end of the separator. To offset this, and thus to provide for more uniform flow through the baffles, I provide means for retarding the flow more and more as the steam outlet 13 is approached. To this end, in this instance, I prefer to make the steam inlet 51 to the interior casing 56 tapering, as indicated, with the narrow portion of the inlet slot adjacent the outlet end of the separator. The exact shape of the slot will depend upon the requirements to produce uniform flow throughout all portions of the baffles, but in a general way the sides of the slot are curved somewhat as indicated in Fig. 3. These curves forming the sides of the slots, provide for a very narrow slot at the outlet end of the separator, and for an opening extending entirely across the top of the casing at the other end of the separator. Although any suitable form of curves may be used, yet I prefer the curves substantially as indicated.

The end baffles 55 also may be used, or the end of the separator may be closed, if desired. With the end baffles a large amount of steam enters at this end of the separator and this makes it desirable to have the slots 51 tapering still more.

Preferably the sides 50 of the inner casing 56 terminate before reaching the baffles 55 so that the ends of the sides are spaced a material distance from these baffles, leaving the space 57 through which the steam can pass to the inner casing 56 from any of the baffles adjacent the outer end of the separator.

I claim as my invention:

1. A fluid separator comprising a middle casing having means in its top for purifying the fluid, and an inner casing comprising a steam tight wall mounted beneath said means and extending longitudinally within the middle casing, said wall being inclined downwardly and outwardly toward the sides of said casing from the central portion of said means, the lower edges of the wall being spaced from the walls of the middle casing.

2. A fluid separator comprising an elongated outer casing having means in its top for purifying the fluid, a gas outlet communicating with one end of said casing, and an elongated plate mounted beneath said means, said plate extending longitudinally within the casing substantially from one end to the other and being inclined downwardly and outwardly from the central portion of said purifying means, the lower edge of the plate being spaced from the wall of the casing, the end of the edge most remote from the said outlet being spaced farthest from said wall.

3. A fluid separator comprising an outer casing having means in its top for purifying the fluid, a fluid outlet communicating with said casing, and baffle plates mounted beneath said means, said plates extending longitudinlly within the casing and being inclined downwardly and outwardly from the central portion of said purifying means, and a middle casing enclosing said plates but spaced therefrom, the upper edges of the sides of said middle casing extending substantially to said purifying means.

4. A fluid separator comprising an outer casing having means in its top for purifying the fluid, a fluid outlet communicating with said casing, and plates mounted beneath said purifying means, said plates extending downwardly and outwardly from the central portion of said purifying means, a middle casing enclosing said plates, the upper edges of the sides of said middle casing extending substantially to said purifying means, said middle casing being spaced away from the walls of said outer casing and from said inclined plate.

5. A steam separator comprising an outer casing, the upper side and the central portion of one end thereof each having a bank of fluid purifying baffles mounted therein, and an inner casing with the walls thereof spaced a material distance away from the walls of said outer casing.

6. A gas purifier comprising an elongated outer casing, a gas outlet at one end of the casing, gas purifying baffles mounted in the other end of said casing, and an inner casing mounted within said outer casing and extending from adjacent said outlet to adjacent said baffles, the end of said inner casing adjacent said baffles being open and being spaced a material distance away from said baffles, and gas purifying baffles mounted in the top of said outer casing.

7. A gas purifier comprising an elongated outer casing, a gas outlet spaced a very material distance from one end of the casing, gas purifying baffles mounted in the said end and in the top of said casing, and a middle casing mounted within said outer casing and extending from adjacent said outlet to adjacent said end baffles.

8. A gas purifier comprising an elongated outer casing, a gas outlet remote from one end of the casing and communicating with said casing, gas purifying baffles mounted in the said end and in the top of said casing, a middle casing mounted within said outer casing and extending from adjacent said outlet to adjacent said end baffles, and a gas inlet to said middle casing extending substantially from one end to the other thereof.

9. A gas purifier comprising an elongated outer casing, a gas outlet communicating with said casing at a point remote from one end, gas purifying baffles mounted in the said end and in the top of said casing, a middle and an inner casing mounted within said outer casing and extending from adjacent said outlet to adjacent said end baffles, and a gas inlet to said inner casing extending substantially from one end to the other thereof, the said inlet increasing in width as said end baffles are approached, the said inlet being formed by the walls of the middle casing and the plates forming the walls of the inner casing.

10. A gas purifier comprising an elongated outer casing, having a gas outlet remote from one end of the casing, gas purifying baffles mounted in the said end of said casing, and a middle casing mounted within said outer casing and extending from adjacent said outlet to adjacent said end baffles, the end of said middle casing adjacent said end baffles being open and the upper wall of said middle casing being spaced a material distance away from said end baffles.

11. A steam separator comprising banks of baffles positioned at the top of said separator, an inner casing mounted beneath said baffles, the top side of said casing being inclined downwardly and outwardly from the central portion of said banks, and the side walls of said casing extending upwardly to said baffles.

12. A steam separator as claimed in claim 1, in which said purifying means comprise trough baffles inclined to the horizontal, whereby the moisture separated from the steam by the baffles runs down to one end of the baffles.

13. A steam separator as claimed in claim 1, in which said purifying means comprise trough baffles inclined to the horizontal, whereby the moisture separated from the steam by the baffles runs down to one end of the baffles, the upper ends of said baffles being above said casings and the lower ends projecting to each side of said middle casing.

14. A steam separator as claimed in claim 1, in which said purifying means comprise baffles inclined to the horizontal, whereby the moisture separated from the the steam by the baffles runs down to one end of the baffles, and an outer casing enclosing said middle casing for receiving the water passing from the lower ends of said baffles.

15. A steam separator comprising an outer casing, the upper side and one end thereof each having fluid purifying baffles mounted therein, an inner casing with the walls thereof spaced a material distance away from the walls of said outer casing, said inner casing being open on its lower side, and a middle casing between said outer and inner casings, with its walls spaced away from the walls of said inner casing, said middle casing being open on top.

16. A gas purifier comprising an elongated outer casing, a gas outlet at one end of the casing, gas purifying baffles mounted in the other end and in the top of said casing, an inner casing mounted within said outer casing and extending from adjacent said outlet to adjacent said end baffles, a middle casing mounted in said outer casing, and a gas inlet to said inner casing extending substantially from one end to the other, the said inlet increasing in width as said end baffles are approached, and at a rate greater than the increase in distance from said outlet, the said inlet being formed by the wall of the middle casing and the plates forming the inner casing.

In testimony whereof, I hereunto set my hand.

ROGER W. ANDREWS.